(12) United States Patent
Bolkhovitin et al.

(10) Patent No.: US 10,860,446 B2
(45) Date of Patent: Dec. 8, 2020

(54) FAILED STORAGE DEVICE REBUILD USING DYNAMICALLY SELECTED LOCATIONS IN OVERPROVISIONED SPACE

(71) Applicant: Western Digital Technologies, Inc., San Jose, CA (US)

(72) Inventors: Vladislav Bolkhovitin, San Jose, CA (US); Siva Munnangi, San Jose, CA (US)

(73) Assignee: Western Digital Technologiies, Inc., San Jose, CA (US)

( * ) Notice: Subject to any disclaimer, the term of this patent is extended or adjusted under 35 U.S.C. 154(b) by 196 days.

(21) Appl. No.: 15/963,829

(22) Filed: Apr. 26, 2018

(65) Prior Publication Data

US 2019/0332504 A1 Oct. 31, 2019

(51) Int. Cl.
*G06F 11/20* (2006.01)
*G06F 3/06* (2006.01)
*G06F 11/10* (2006.01)

(52) U.S. Cl.
CPC ........ *G06F 11/2094* (2013.01); *G06F 3/0683* (2013.01); *G06F 3/0617* (2013.01);
(Continued)

(58) Field of Classification Search
CPC ...... G06F 3/0646; G06F 3/065; G06F 3/0647; G06F 3/0683; G06F 3/0685; G06F 3/0689; G06F 3/0688; G06F 3/064; G06F 11/1076; G06F 11/1088; G06F 11/1092; G06F 11/2094; G06F 11/2053; G06F 11/2069; G06F 16/1827; H04L 67/1095; H04L 67/1097

See application file for complete search history.

(56) References Cited

U.S. PATENT DOCUMENTS 5,388,083 A * 2/1995 Assar .................... G06F 3/0601
365/185.09
6,092,215 A 7/2000 Hodges et al.
(Continued)

FOREIGN PATENT DOCUMENTS

WO 2015116197 A1 8/2015

OTHER PUBLICATIONS

International Search Report and Written Opinion of Internationals Application No. PCT/US2019/035087, dated Sep. 25, 2019, 11 pages.
(Continued)

*Primary Examiner* — Joseph O Schell
(74) *Attorney, Agent, or Firm* — Patent Law Works LLP (57) ABSTRACT

Methods and systems for rebuilding a failed storage device in a storage system using a plurality of dynamically selected locations in a system-level overprovisioned (OP) space. For example, a method including designating a portion of a usable space in a storage system as a system-level OP space; in response to a detection of a failed storage device in the storage system, reconstructing data of the failed storage device based on data read from a plurality of functioning storage devices in the storage system; and storing the reconstructed data of the failed storage device in a plurality of dynamically selected locations in the system-level OP space of the plurality of functioning storage devices.

20 Claims, 7 Drawing Sheets

(52) U.S. Cl.
CPC .......... *G06F 3/0619* (2013.01); *G06F 3/0647* (2013.01); *G06F 3/0688* (2013.01); *G06F 11/1088* (2013.01); *G06F 2201/82* (2013.01)

(56) References Cited

U.S. PATENT DOCUMENTS

| | | | |
|---|---|---|---|
| 7,293,133 B1* | 11/2007 | Colgrove | G06F 3/0608 |
| | | | 711/111 |
| 7,596,570 B1* | 9/2009 | Emigh | G06F 11/1453 |
| 7,783,600 B1 | 8/2010 | Spertus et al. | |
| 8,289,641 B1 | 10/2012 | Emami | |
| 8,904,261 B2 | 12/2014 | Cideciyan et al. | |
| 9,262,278 B2* | 2/2016 | Ben Romdhane | G06F 11/1458 |
| 10,241,722 B1 | 3/2019 | Malwankar et al. | |
| 10,289,507 B1 | 5/2019 | Malwankar et al. | |
| 10,409,769 B1 | 9/2019 | Malhotra et al. | |
| 2003/0135514 A1* | 7/2003 | Patel | G06F 11/1076 |
| 2005/0080991 A1* | 4/2005 | Keohane | G06F 11/2056 |
| | | | 711/114 |
| 2005/0114726 A1 | 5/2005 | Ouchi | |
| 2006/0143503 A1* | 6/2006 | Shaik | G06F 3/061 |
| | | | 714/6.2 |
| 2007/0245082 A1 | 10/2007 | Margolus et al. | |
| 2008/0104445 A1 | 5/2008 | Ananthamurthy | |
| 2010/0030960 A1* | 2/2010 | Kamalavannan | G06F 11/1076 |
| | | | 711/114 |
| 2010/0251073 A1 | 9/2010 | Stolowitz | |
| 2010/0280998 A1* | 11/2010 | Goebel | G06F 11/2094 |
| | | | 707/652 |
| 2011/0029711 A1 | 2/2011 | Dhuse et al. | |
| 2011/0055178 A1* | 3/2011 | Mark | G06F 3/0619 |
| | | | 707/697 |
| 2012/0011200 A1 | 1/2012 | Zhang et al. | |
| 2012/0079317 A1 | 3/2012 | Nelogal et al. | |
| 2013/0179753 A1 | 7/2013 | Flynn et al. | |
| 2013/0268824 A1 | 10/2013 | Shalvi et al. | |
| 2013/0339599 A1* | 12/2013 | Sundrani | G06F 3/061 |
| | | | 711/114 |
| 2014/0237298 A1 | 8/2014 | Pe'er | |
| 2014/0258598 A1 | 9/2014 | Canepa et al. | |
| 2015/0089130 A1* | 3/2015 | Rose | G06F 3/0607 |
| | | | 711/114 |
| 2015/0205668 A1 | 7/2015 | Sundaram et al. | |
| 2015/0205669 A1 | 7/2015 | Sundaram et al. | |
| 2015/0324262 A1 | 11/2015 | Chinnakkonda Vidyapoornachary et al. | |
| 2016/0092309 A1 | 3/2016 | Gao et al. | |
| 2016/0188424 A1 | 6/2016 | Walls | |
| 2016/0217040 A1 | 7/2016 | Jin et al. | |
| 2016/0239397 A1 | 8/2016 | Thomas et al. | |
| 2016/0342476 A1* | 11/2016 | Nazari | G06F 12/0246 |
| 2017/0116074 A1 | 4/2017 | Hayes et al. | |
| 2017/0123915 A1* | 5/2017 | Nguyen | G06F 11/1451 |
| 2017/0269862 A1* | 9/2017 | Agombar | G06F 3/0607 |
| 2017/0270018 A1 | 9/2017 | Xiao et al. | |
| 2017/0286237 A1 | 10/2017 | Condict et al. | |
| 2017/0329542 A1* | 11/2017 | Chou | G06F 3/0619 |
| 2018/0032446 A1 | 2/2018 | Amarendran et al. | |

OTHER PUBLICATIONS

International Search Report and Written Opinion of Internationals Application No. PCT/US2019/035088, dated Sep. 26, 2019, 10 pages.

U.S. Appl. No. 15/722,666, entitled "Redundancy Coding Stripe Based on Coordinated Internal Address Scheme Across Multiple Devices," filed Oct. 20, 2017 (73 pages).

International Search Report and Written Opinion of Application No. PCT/US2018/062498, Filed Nov. 26, 2018 (20 pages).

U.S. Appl. No. 15/722,665, entitled "Redundancy Coding Stripe Based on Coordinated Internal Address Scheme Across Multiple Devices," filed Oct. 20, 2017 (73 pages).

U.S. Appl. No. 15/936,327, entitled "Data Storage Drive Rebuild with Parity Generation Offload Using Peer-to-Peer Data Transfers," filed Mar. 26, 2018 (85 pages).

* cited by examiner

FAILED STORAGE DEVICE REBUILD USING DYNAMICALLY SELECTED LOCATIONS IN OVERPROVISIONED SPACE

BACKGROUND

The present disclosure relates to storage systems. In a more particular example, the present disclosure relates to methods and systems for rebuilding a failed storage device in a storage system using dynamically selected locations in a system-level overprovisioned (OP) space.

Storage systems with a plurality of storage devices typically employ data redundancy techniques (e.g., RAID mirroring or parity, erasure coding) to allow the recovery of data from and rebuilding of a failed storage device. However, one problem associated with the storage device rebuild process is where to store the data recovered from the failed storage device.

SUMMARY

The present disclosure relates to methods and systems for rebuilding a failed storage device in a storage system using a plurality of dynamically selected locations in a system-level overprovisioned (OP) space.

As discussed above, a problem associated with the storage device rebuild process is where to store the data recovered from the failed storage device. One possible solution is to wait until the failed storage device has been repaired or replaced before storing the recovered data on the restored storage device. However, in the time before the failed storage device has been restored, the storage system experiences a degraded mode of operation during which, for example, data must first be rebuilt before servicing storage requests for the failed storage device and more operations are required to compute error-correction blocks or chunks.

Another possible solution is to reserve one of the storage devices as a hot spare and store the recovered data onto the hot spare. While a dedicated hot spare minimizes the time in which the storage system experiences a degraded mode of operation, a hot spare increases the hardware cost of the storage system.

A further possible solution is to use a thin-provisioned environment that dynamically decreases the capacity available to the host at a level necessary to rebuild the data from the failed storage device. This approach is relatively complex to implement and may lead to complications of handling out of space events in which the host continues to write data but no free space is left.

In view of the above, there is a need for an improved method for rebuilding a failed storage device in a storage system.

Various embodiments of the present disclosure as disclosed herein may perform a failed storage device rebuild using dynamically selected locations in a system-level OP space in the storage system. In at least some embodiments, each of the locations may be individually selected based on one or more conditions associated with the respective location in the corresponding storage device. As a consequence of this, one or more embodiments of the present disclosure may provide a number of technical features and advantages, including but not limited to one or more of the following: (1) reducing the cost of operating and/or maintaining the storage system, (2) reducing the time that the storage system experiences a degraded mode of operation after a storage device failure, (3) reducing the implementation complexity of the storage system, (4) improving the performance (e.g., reducing a latency) of the storage system; and (5) improving the reliability (e.g., increasing a life expectancy) of the storage system.

The present disclosure includes, but is not limited to, the following aspects:

According to one innovative aspect, a method including designating a portion of a usable space in a storage system as a system-level overprovisioned (OP) space; in response to a detection of a failed storage device in the storage system, reconstructing data of the failed storage device based on data read from a plurality of functioning storage devices in the storage system; and storing the reconstructed data of the failed storage device in a plurality of dynamically selected locations in the system-level OP space of the plurality of functioning storage devices.

According to another innovative aspect, a storage system including a storage array including a plurality of storage devices; one or more processors; and logic executable by the one or more processors configured to perform operations comprising: designating a portion of a usable space in the storage array as a system-level overprovisioned (OP) space; in response to a detection of a failed storage device in the storage array, reconstructing data of the failed storage device based on data read from a plurality of functioning storage devices in the storage array; and storing the reconstructed data of the failed storage device in a plurality of dynamically selected locations in the system-level OP space of the plurality of functioning storage devices.

According to yet another innovative aspect, an apparatus, comprising: one or more processors; and logic executable by the one or more processors configured to perform operations comprising: designating a portion of a usable space in a storage system as a system-level overprovisioned (OP) space; in response to a detection of a failed storage device in the storage system, reconstructing data of the failed storage device based on data read from a plurality of functioning storage devices in the storage system; and storing the reconstructed data of the failed storage device in a plurality of dynamically selected locations in the system-level OP space of the plurality of functioning storage devices.

These and other implementations may each optionally include one or more of the following features: that the method or operations further include in response to an installation of a replacement storage device in the storage system, copying the reconstructed data from the plurality of dynamically selected locations in the system-level OP space of the plurality of functioning storage devices to the replacement storage device; that the method or operations further include restoring the plurality of dynamically selected locations in the system-level OP space of the plurality of functioning storage devices; that the storing the reconstructed data includes individually selecting each dynamically selected location of the plurality of dynamically selected locations based on a condition associated with the dynamically selected location and storing the reconstructed data of the failed storage device in the plurality of dynamically selected locations; that the condition includes one or more of: whether the dynamically selected location is currently unused, whether the dynamically selected location satisfies one or more performance-related criteria, and whether the dynamically selected location satisfies one or more reliability-related criteria; that at least one of the one or more performance-related criteria relates to reducing a latency of the storage system; that the at least one performance-related criteria is that a present length of a data queue associated with the dynamically selected location does not exceed a predetermined threshold; that at least one of the one or more reliability-related criteria relates to increasing a life expectancy of the storage system; that the at least one reliability-related criteria is that a present erase count associated with the dynamically selected location does not exceed a predetermined threshold; and that the method or operations further include using one or more dynamic stripes configured to store the reconstructed data of the failed storage device and a stripe mapping table including location information that corresponds to the one or more dynamic stripes.

Other implementations of one or more of these aspects include corresponding systems, apparatus, and computer programs, configured to perform the actions of the methods, encoded on computer storage devices. It should be understood that language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Novel data processing technology, such as but not limited to systems, devices, and methods for rebuilding a failed storage device in a storage system using dynamically selected locations in a system-level overprovisioned (OP) space are disclosed. While this technology is described below in the context of a particular system architecture in various cases, it should be understood that the systems and methods can be applied to other architectures and organizations of hardware. More specifically, it should be noted that while the following description is made with reference to certain embodiments, the present disclosure may apply to any storage system that implements data redundancy known or contemplated.

Figure 1:
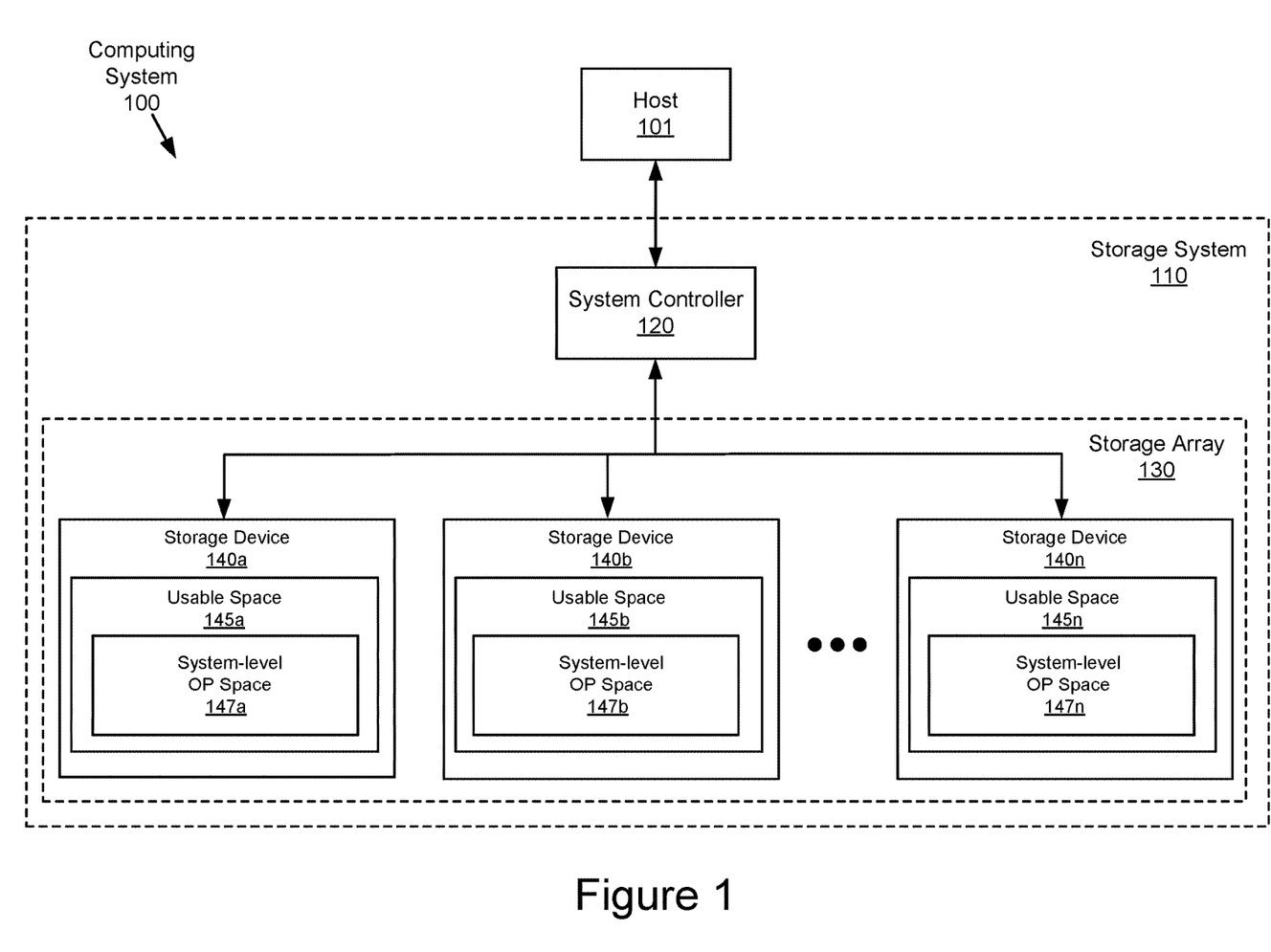
FIG. 1 depicts a block diagram of an example computing system including a host and a storage system having a plurality of storage devices of which one or more portions may be designated as system-level overprovisioned (OP) space, in accordance with an embodiment.

FIG. 1 depicts a block diagram of an example computing system 100 including a host 101 and a storage system 110 having a plurality of storage devices 140 of which one or more portions may be designated as system-level overprovisioned (OP) space, in accordance with an embodiment. It should be noted that the figure shows a simplified diagrammatic representation of the contents of the storage devices 140 rather than their actual physical implementation.

The host 101 may be one or more of any suitable computer devices or systems, such as a server computer, a desktop computer, a laptop computer, a tablet computer, a mobile telephone, or any other electronic device capable of making requests to the storage system 110. In some embodiments, the host 101 may include one or more processors, one or more memory devices, and any other suitable components to add functionality to the host 101.

The host 101 may be communicatively coupled to the storage system 110 through a network, such as a local-area network (LAN), wide-area network (WAN), switched fabric network, wired or wireless network, private or public network, etc.

The host 101 may execute one or more applications that make storage requests (e.g., read, write, etc.) to the storage system 110. In some embodiments, the one or more applications may be dedicated software applications running on the host 101 or may alternatively reside on other suitable computing devices and may be remotely executed by the host 101.

The storage system 110 may comprise a system controller 120 and a storage array 130 coupled to the system controller. As described in more detail with respect to FIG. 7 below, the system controller 120 may comprise one or more computing devices and software configured to manage the operation of and provide an external interface to (e.g., for communication with the host 101) the storage array 130. For example, and as will be discussed in more detail below, the system controller 120 may coordinate and perform various operations on storage devices of the storage array 130 including data redundancy and/or recovery, storage device rebuild, and/or garbage collection. In addition, in some embodiments the system controller 120 may coordinate communications between the host 101 and the storage array 130, including forwarding read or write requests from the host 101 to the corresponding storage device 140 (including performing any necessary address translation as described further below), and retrieving data from the storage devices in a logical manner (e.g., chunks may be assembled into a stripe) before being returned to the host 101. The system controller 120 may comprise one or more processors, one or more memory devices, and software and/or logic for performing these functions.

The storage array 130 may comprise a plurality of storage devices 140a, 140b, . . . , 140n, each of which may contain one or more non-transitory media or devices for storing computer-usable (e.g., readable, writable, etc.) information in any form (e.g., data, programs, instructions, etc.). Each of the storage devices 140 may be a volatile or non-volatile memory device with suitable characteristics, such as flash memory (e.g., solid-state drive (SSD)), persistent memory (PM), and/or hard disk media including shingled magnetic recording (SMR) disks, hybrid storage devices, etc.

As discussed below with respect to FIG. 2, the storage system 110 may be configured using a suitable redundancy scheme such as RAID or erasure coding such that in the event of a failure of one or more of the storage devices 140a, 140b, ..., 140n (henceforth to be referred to as a failed storage device 140'), a storage device rebuild process may be performed to recover the data from the failed storage device(s). In the present disclosure, a "failed storage device" may refer to any storage device that is not properly functioning in any respect, including a storage device 140 that is still operational but may be deemed "failed" based on an early warning indication.

In some embodiments, the information may be organized in the storage devices 140a, 140b, ..., 140n in the form of chunks (shown below in FIGS. 4A and 4B), of which each chunk may be composed of one or more blocks residing on the same storage device 140, as described further below. Further, as described below with respect to FIG. 4B, the chunks may be written to a plurality of dynamically selected locations in the storage devices 140a, 140b, ..., 140n in the form of dynamic stripes using a suitable data structuring methodology such as log-structuring. Further examples of dynamic stripes and associated mapping schemes that may be operative with the storage system 110 are disclosed in commonly-assigned, copending U.S. application Ser. No. 15/722,666, entitled "Redundancy Coding Stripe Based on Coordinated Internal Address Scheme Across Multiple Devices," filed on Oct. 2, 2017 and U.S. application Ser. No. 15/936,327, entitled "Data Storage Drive Rebuild with Parity Generation Offload Using Peer-to-Peer Data Transfers," filed on Mar. 26, 2018, the disclosures of which are hereby incorporated by reference in its entirety.

Each of the storage devices 140a, 140b, ..., 140n in the storage system 110 may include usable spaces 145a, 145b, ..., 145n. The usable spaces 145a, 145b, ..., 145n of the corresponding storage devices 140a, 140b, ..., 140n in the storage system 110 may each correspond to the total available storage capacity of the respective storage device excluding any device-level overprovisioned space (not shown), if present, in the storage device. As is known in the art, device-level overprovisioned space may comprise storage capacity of the storage device 140 that is only accessible internally to the device and is used for internal storage management functions such as device-level garbage collection. The usable spaces 145a, 145b, ..., 145n may be collectively referred to as the usable space 145 of the storage system 110.

As described below with respect to FIG. 2, one or more portions of the usable spaces 145a, 145b, ..., 145n of the corresponding storage devices 140a, 140b, ..., 140n may be designated as system-level overprovisioned (OP) spaces 147a, 147b, ..., 147n, respectively. The system-level OP spaces 147a, 147b, ..., 147n may be visible and/or accessible to the system controller 120, but may not be visible to the host 101. It should be noted that the system-level OP space 147 of each storage device 140 is separate and distinct from the device-level overprovisioned space mentioned earlier. The system-level OP spaces 147a, 147b, ..., 147n may be collectively referred to as the system-level OP space 147 of the storage system 110.

The system-level OP space 147 of the storage system 110 may be used by the system controller 120 to perform system maintenance functions such as system-level garbage collection (e.g., garbage collection which involves copying blocks from one storage device 140 to another). The system-level OP space 147 may increase the garbage collection efficiency for the storage system 110, thereby reducing the system-level write amplification.

As described further below with respect to FIG. 2, in the event that a storage device 140 in the storage system 110 fails, a plurality of dynamically selected locations in the system-level OP space 147 may be used to temporarily store reconstructed data of the failed storage device 140' as part of the storage device rebuild process. Upon the replacement (or repair) of the failed storage device, the reconstructed data may be copied from the system-level OP space 147 onto the replacement (or repaired) storage device, and the system-level OP space 147 may be made available again for use in system maintenance functions such as garbage collection.

It should be noted that the use of system-level OP space 147 to store the reconstructed data of the failed storage device 140' may temporarily reduce the amount of system-level OP space available for performing system maintenance functions such as system-level garbage collection, thereby reducing the garbage collection efficiency and increasing the write amplification for the storage system 110. In consideration of this, in some embodiments, there may be a limit on the maximum amount of system-level OP space 147 that can be used to store the reconstructed data of the failed storage device, and this limit may be dependent on the write amplification of the system-level garbage collection. If the system-level write amplification is high, the limit may be decreased (e.g., more system-level OP space reserved for garbage collection). If, however, the system-level write amplification is low, the limit may be increased (e.g., less system-level OP space reserved for garbage collection).

Figure 2:
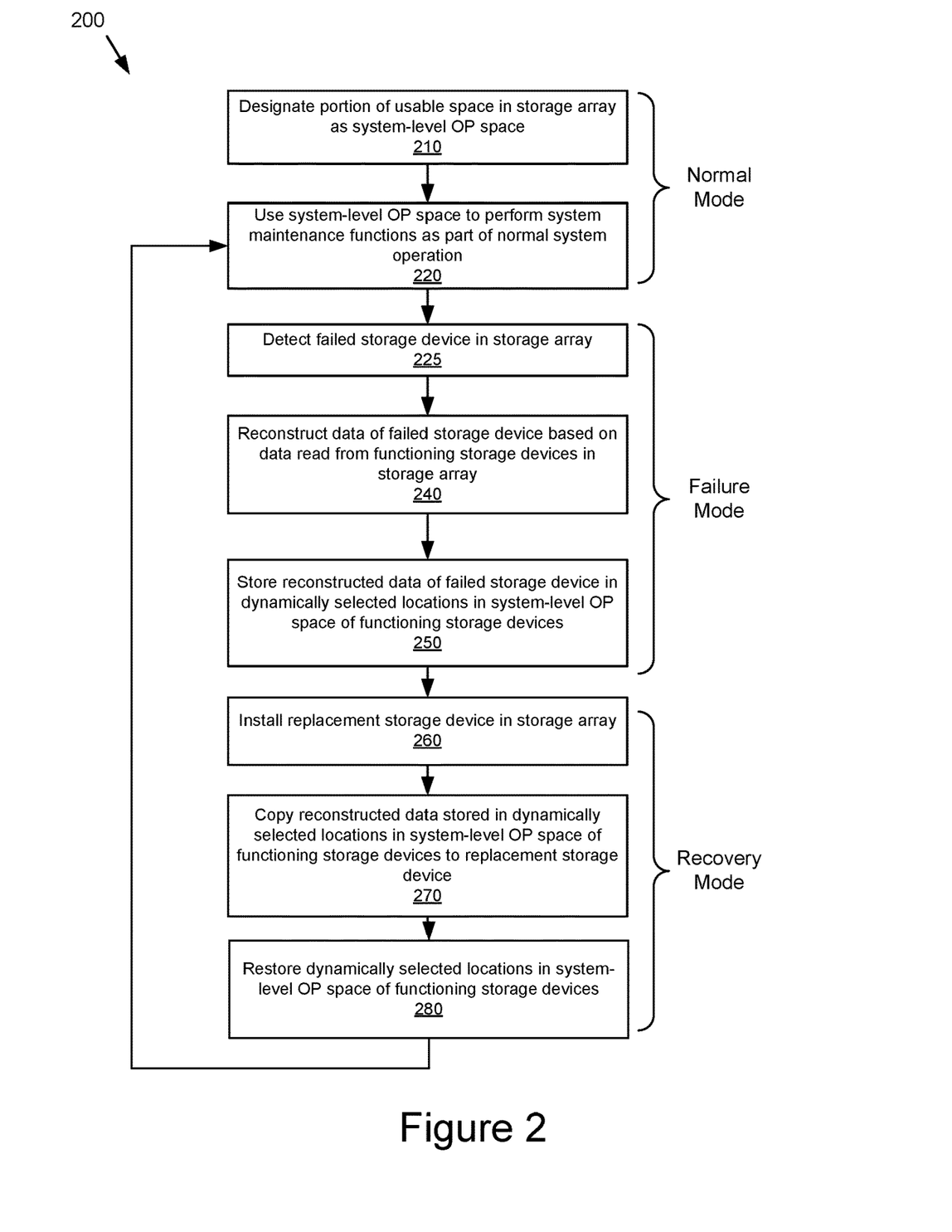
FIG. 2 depicts a flow diagram of an example method for performing a failed storage device rebuild for the storage system shown in FIG. 1, in accordance with an embodiment.

FIG. 2 depicts a flow diagram of an example method 200 for performing a failed storage device rebuild for the storage system 110 shown in FIG. 1, in accordance with an embodiment.

Blocks 210 and 220 may occur during a normal mode of operation of the storage system 110 prior to a failure of a storage device 140. In block 210, the system controller 120 may designate one or more portions of a usable space 145 as a system-level OP space 147. In some embodiments, block 210 may occur during an initialization process of the storage system 110.

In some embodiments, the one or more portions of usable space 145 designated as system-level OP space 147 in block 210 may comprise a predetermined percentage of the usable space in the storage array 130. The percentage of usable space designated as system-level OP space 147 may comprise an amount sufficient for garbage collection to continue while performing the storage device rebuild process. In one example, a storage array 130 with nine storage devices 140 in an 8+1 configuration (indicating the number of storage devices 140 for storing data and error-correction information, respectively) may contain a total of 100 GB of usable space. In this example, 15% (i.e., 15 GB) of the usable space 145 in the storage array may be designated as system-level OP space 147.

In block 220, the system controller 120 may use the system-level OP space 147 to perform system maintenance functions (e.g., system-level garbage collection) as part of the normal mode of operation of the storage system 110. The system-level OP space 147 may be used to perform the system-level garbage collection more efficiently and thereby reduce undesired write amplification.

In block 225, the system controller 120 may detect a failed storage device 140' in the storage system 110, and in response the storage system 110 may enter a failure mode. At this time, the storage system 110 may have a reduced storage array configuration in a degraded mode of operation.

In block 240, the system controller 120 may reconstruct data of the failed storage device 140' based on data read from the one or more functioning (e.g., non-failed) storage devices 140 in the storage array 130. In some embodiments, the data of the failed storage device 140' may be reconstructed based on one or more data chunks and one or more error-correction (e.g., parity) chunks read from the functioning storage devices 140 as appropriate for the data redundancy scheme (e.g., RAID parity or erasure coding) of the storage system 110. In some embodiments, a data chunk in the failed storage device 140' may be reconstructed by performing an exclusive-OR (XOR) operation on the available data chunks and/or parity chunks of the functioning storage devices 140 in the corresponding stripe in the storage array 130.

In block 250, the system controller 120 may store the reconstructed data generated in block 240 in a plurality of dynamically selected locations (as described in more detail in FIG. 4B below) in the system-level OP spaces 147 of the functioning storage devices 140. In some embodiments, as described below with respect to FIG. 3, each of the plurality of dynamically selected locations in the system-level OP space 147 may be individually selected based on one or more conditions associated with the respective location in the corresponding functioning storage device. In embodiments where the storage array 130 includes one or more spare storage devices, block 250 may also include storing at least a portion of the reconstructed data in the spare storage device(s).

The amount of system-level OP space 147 that is required to store the reconstructed data of the failed storage device 140' may depend on various considerations. In an embodiment, the amount of system-level OP space 147 that is required to store the reconstructed data of the failed storage device 140' may be equal to the usable space 145 of the failed storage device. In another embodiment, the amount of system-level OP space 147 that is required to store the reconstructed data of the failed storage device 140' may be equal to the amount of space needed to store all of the reconstructed data. In yet another embodiment, the amount of system-level OP space 147 that is required to store the reconstructed data of the failed storage device 140' may be adjusted as needed during the storage device rebuild process and may vary over time. For instance, a portion of the system-level OP space 147 may be used to store one reconstructed data chunk, then another portion of the system-level OP space may be used to store another reconstructed data chunk, and so on.

In the above example, the storage array 130 is now in a reduced 7+1 configuration and each of the functioning storage devices 140 additionally may need to use 12.5% (i.e., 1/(9−1)) of their capacity to store the reconstructed data of the failed storage device 140'. Thus, the amount of system-level OP space 147 in the functioning storage devices 140 remaining after the reconstructed data of the failed storage device is stored is reduced to 2.5% (i.e., 15%−12.5%, or 2.5 GB) of the usable space 145. This may be considered an acceptable level, considering that the reduced amount of system-level OP space is a temporary condition.

In block 260, a replacement storage device 140" may be installed (e.g., by a technician) to take the place of the failed storage device 140' in the storage array 130. In some embodiments, the failed storage device 140' may be repaired instead of installing the replacement storage device 140".

In block 270, the system controller 120 may copy the reconstructed data stored in the dynamically selected locations in the system-level OP spaces 147 of the functioning storage devices 140 to the replacement storage device 140" in the storage array 130. In some embodiments, block 270 may also include computing one or more new error-correction chunks for the reconstructed data and storing the error-correction chunks in the replacement storage device 140". In some embodiments, the error-correction chunks for the reconstructed data may be computed by performing an XOR operation on the data chunks from the functioning storage devices 140 and the reconstructed data chunks of the failed storage device 140' in the corresponding stripe in the storage array 130. At this time, the storage array 130 has been restored to its original storage array configuration prior to the failure of failed storage device 140'.

In block 280, the system controller 120 may restore the dynamically selected locations in the system-level OP spaces 147 of the functioning storage devices 140 that were used to store the reconstructed data in block 250 so that they may be used, for example, for system maintenance functions such as garbage collection.

Upon the completion of block 280, the failed storage device rebuild process has been completed. At this time, the data redundancy protection level and the amount of system-level OP space 147 in the storage system 110 has been restored to the level prior to the failure of failed storage device 140'. In the above example of the 8+1 storage array, the functioning storage devices 140 may return the 12.5% of their respective capacity used for storing the reconstructed data in system-level OP space 147, thereby restoring the system-level OP space to 15% of the usable space 145. Consequently, the storage system 110 may resume a normal mode of operation in which the system-level OP space 147 may be used to efficiently perform system-level garbage collection (block 210).

Figure 3:
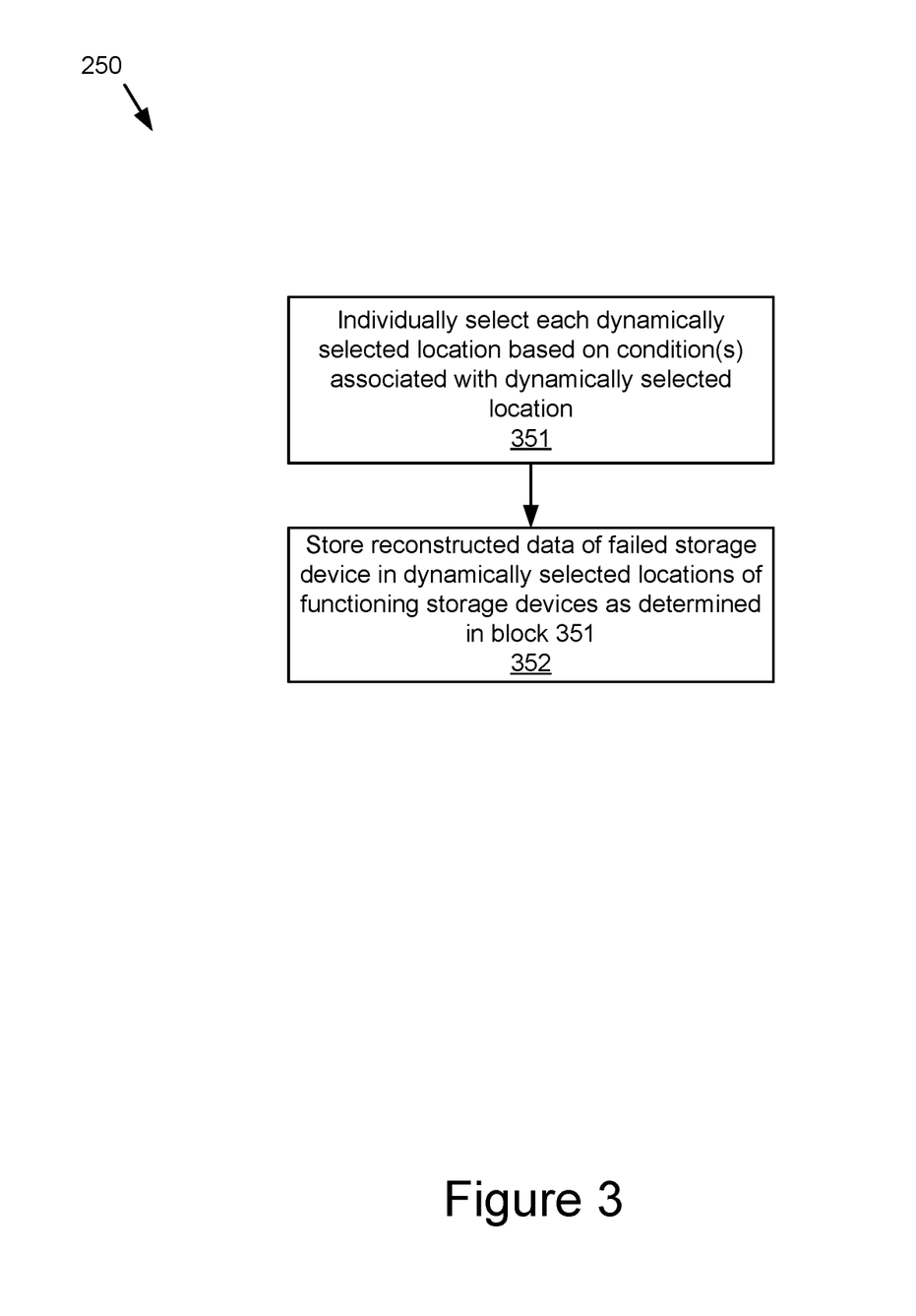
FIG. 3 depicts a flow diagram of an example method for performing the storing of reconstructed data of the failed storage device in dynamically selected locations in system-level OP space shown in FIG. 2, in accordance with an embodiment.

FIG. 3 depicts a flow diagram of an example method for performing the storing of reconstructed data of the failed storage device 140' in dynamically selected locations in system-level OP space (block 250) shown in FIG. 2, in accordance with an embodiment. In block 351, the system controller 120 may individually select each dynamically selected location of the plurality of dynamically selected locations based on one or more conditions associated with the dynamically selected location. One condition may be that the dynamically selected location satisfies one or more performance-related criteria, such as that a present length of a data queue associated with the location does not exceed a predetermined threshold. Another condition may be that the dynamically selected location satisfies one or more reliability-related criteria, such as that a present erase count associated with the location does not exceed a predetermined threshold.

In block 352, the system controller 120 may store (e.g., write) the reconstructed data of the failed storage device generated in block 240 of FIG. 2 in the plurality of dynamically selected locations of the functioning storage devices 140 as determined in block 351.

An advantage of the present disclosure of using dynamically selected locations to store data in the storage array 130 as described above in FIGS. 2 and 3 is that the performance and/or reliability of the storage array (e.g., both generally and more specifically in performing the failed storage device rebuild process) may be optimized. In some embodiments, the locations may be selected to reduce a latency and/or increase a life expectancy of the storage array 130.

Figure 4A:
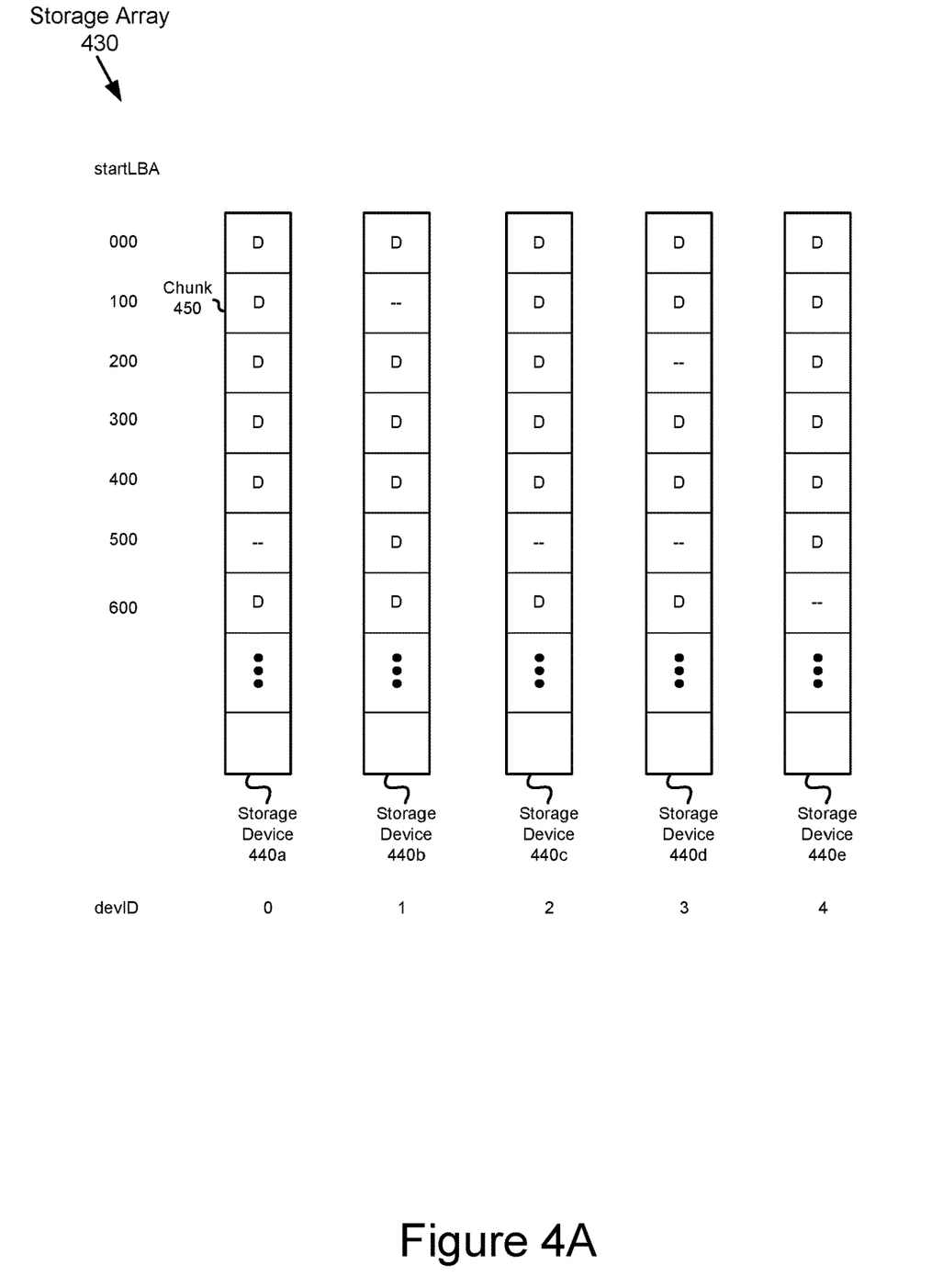
FIGS. 4A and 4B depict block diagrams of an example storage array including a plurality of storage devices illustrating the storing of data in a plurality of dynamically selected locations in the storage array, in accordance with an embodiment.
Figure 4B:
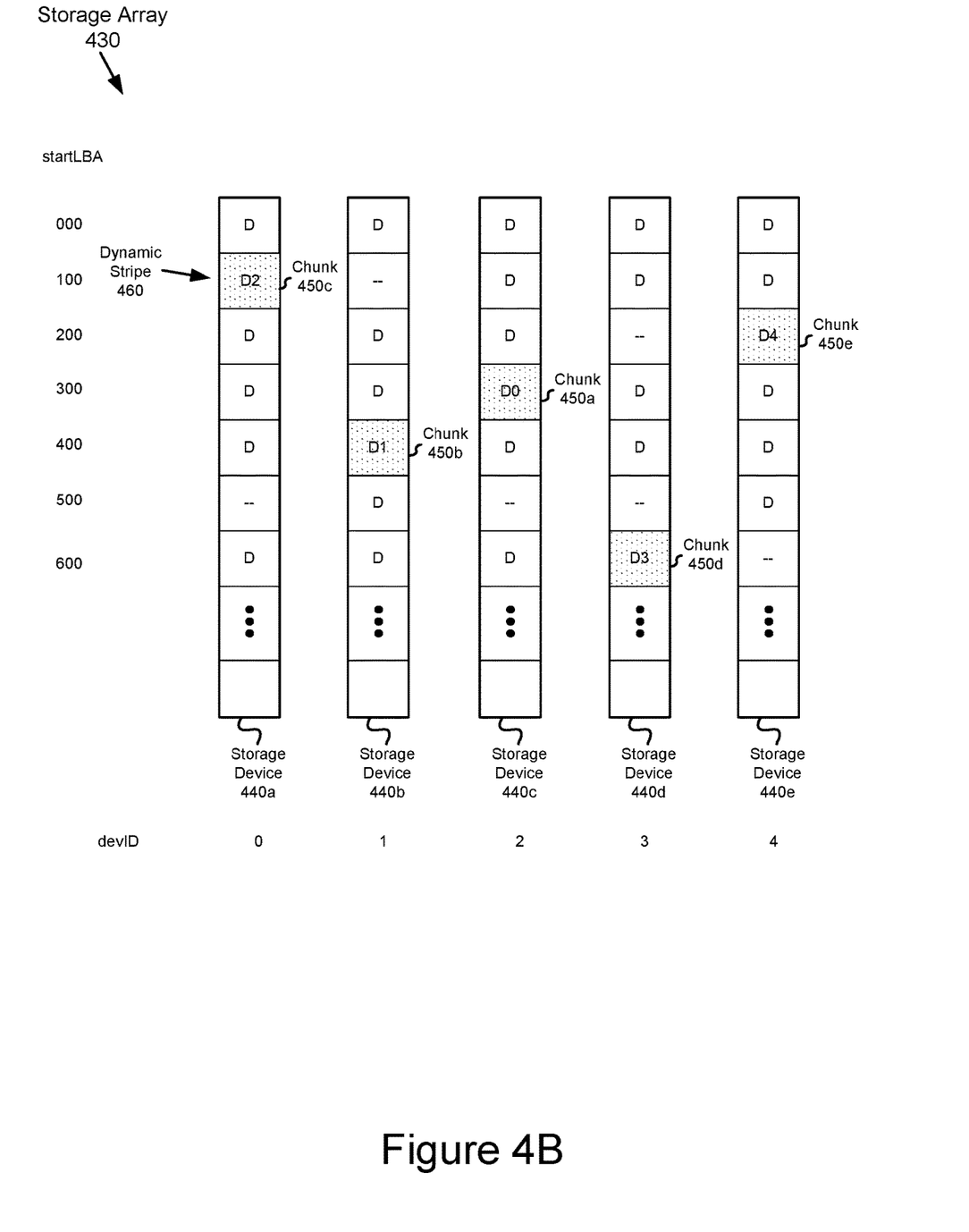

FIGS. 4A and 4B depict block diagrams of an example storage array 430 including a plurality of storage devices 440 illustrating the storing of data in the plurality of dynamically selected locations (e.g., dynamic stripe) in the storage array, in accordance with an embodiment. The storing (e.g., writing) or reading of data in the storage array 430 may occur at one or more of various times during the normal operation or failed storage device rebuild process shown in FIG. 2, including, for example, block 220 (e.g., garbage collection), block 250 (e.g., store reconstructed data of failed storage device), and/or block 270 (e.g., copy reconstructed data to replacement storage device).

The storage array 430 is an embodiment of the storage array 130 shown in FIG. 1 including five storage devices 440a, 440b, 440c, 440d, and 440e. The storage array 430 may be configured using any suitable redundancy scheme such as RAID parity or erasure coding, such that if a storage device 440 in the storage array fails, the storage device rebuild process as described above may be performed to recover the data from the failed storage device. (It should be noted that for purposes of simplicity, storage array 430 does not depict any failed storage devices.)

FIG. 4A illustrates the storage array 430 prior to the storing of data in the plurality of dynamically selected locations in the storage array. As shown in the figure, each of the storage devices 440a-440e in the storage array 430 may contain a plurality of chunks, of which each chunk 450 may contain one or more blocks (not shown) residing on the same storage device 440. Each chunk 450 either may contain data (indicated with a "D") or may be currently unused (e.g., not written with data) (indicated with a "--"). As described in more detail below in FIG. 4B, the plurality of chunks contained in the storage array 430 may be organized into one or more dynamic stripes 460.

In some embodiments, each row of the storage array 430 may correspond to a respective starting logical block address (startLBA) and each column of the storage array may correspond to a respective device ID (devID). For example, as indicated in the figure the rows of the storage array 430 may respectively correspond to startLBAs 000, 100, 200, etc. and the columns of the storage array 430 may respectively correspond to devIDs 0, 1, 2, etc. Thus, the location of each chunk 450 in the storage array 430 may be specified by the location information (devID, startLBA).

FIG. 4B illustrates the storage array 430 after the storing of data in the plurality of dynamically selected locations in the storage array 430. For example, as shown in the figure a dynamic stripe 460 in the storage array 430 may include five chunks 450a, 450b, 450c, 450d, and 450e in which the data D0, D1, D2, D3, and D4 is respectively stored (the chunks in the dynamic stripe 460 are indicated with shading).

The data D0, D1, D2, D3, and D4 may be written to the dynamic stripe 460 using a suitable data structuring methodology such as log-structuring. In a log-structured data organization, random writes of data may be grouped together and written sequentially to the dynamic stripe 460. In some embodiments, the dynamic stripe 460 may comprise a combination of one or more data chunks and one or more error-correction (e.g., parity) chunks as appropriate for the data redundancy scheme used in the storage array 430.

The location of the chunks 450a-450e in the dynamic stripe 460 may be dynamically selected in that the chunk locations are not fixed (e.g., determined by mathematical formula) as in a conventional stripe but instead, for example, may be selected "on-the-fly" out of the chunks that are currently unused (as indicated with a "--" in FIG. 4A) and that have been designated as system-level OP space 147. As can be seen from the figure, the dynamically selected locations of each of the chunks 450a, 450b, 450c, 450d, and 450e in the dynamic stripe 460 may be described by the location information (2, 300), (1, 400), (0, 100), (3, 600), and (4, 200) (e.g., indicating the devID and startLBA for each chunk).

In some embodiments, as mentioned above with respect to FIG. 3, the location of each of the chunks 450a-450e in the dynamic stripe 460 may be individually selected based on one or more conditions associated with the location of the respective chunk. One condition may be that the location of the respective chunk satisfies one or more performance-related criteria, such as that a present length of a data queue associated with the location does not exceed a predetermined threshold. Another condition may be that the location of the respective chunk satisfies one or more reliability-related criteria, such as that a present erase count associated with the location does not exceed a predetermined threshold.

Figure 5:
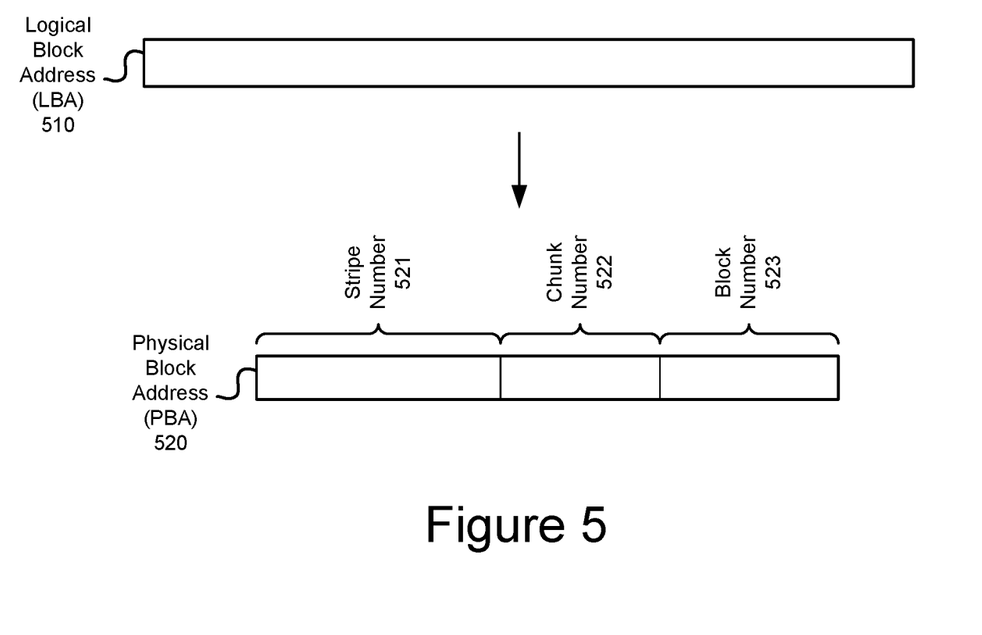
FIG. 5 depicts a schematic view of an example logical block address (LBA) and physical block address (PBA) associated with the storing or reading of data to the storage array, in accordance with an embodiment.

FIG. 5 depicts a schematic view of an example logical block address (LBA) and physical block address (PBA) associated with the storing (e.g., writing) or reading of data to the storage array 430, in accordance with an embodiment.

The logical block address (LBA) 510 may be a logical address associated with the storing or reading of a block of data to the storage array 430 initiated by the host 101 and/or system controller 120. As noted earlier, the storing or reading of data may occur at one or more of various times during the failed storage device rebuild process shown in FIG. 2, including, for example, block 220 (e.g., garbage collection), block 250 (e.g., store reconstructed data of failed storage device), and/or block 270 (e.g., copy reconstructed data to replacement storage device).

The LBA 510 then may be translated to a physical block address (PBA) 520 to access a block in the storage array 430 that corresponds to the read or write request. The PBA 520 may include a stripe number field 521, a chunk number field 522, and a block number field 523. Typically, the LBA 510 is visible and/or accessible to the host 101, while the PBA 520 is not. In some embodiments, the LBA 510 may be translated to the PBA 520 using an address translation table 725 (shown in FIG. 7) contained in the system controller 120.

As described below with respect to FIG. 6, the system controller 120 may then use the PBA 520 to access a stripe mapping table 600 that contains location information for the plurality of dynamically selected locations (e.g., dynamic stripe) in the storage array 430.

Figure 6:
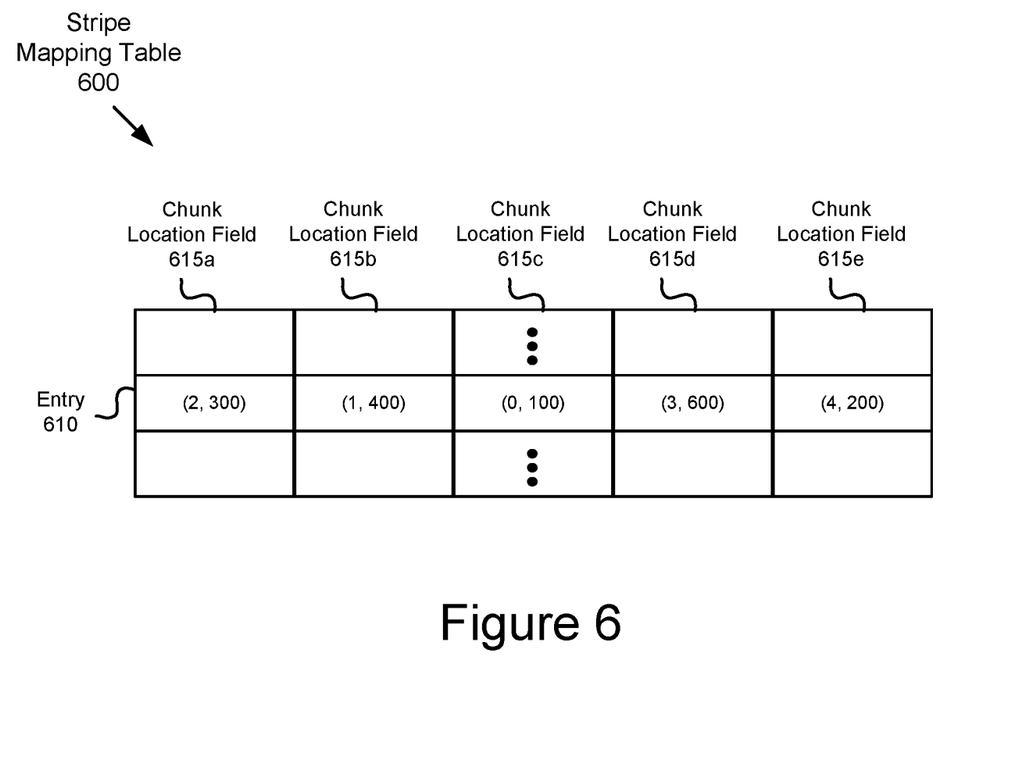
FIG. 6 depicts a schematic view of an example stripe mapping table that may be used in connection with the storing or reading of data to a dynamic stripe in the storage array, in accordance with an embodiment.

FIG. 6 depicts a schematic view of an example stripe mapping table 600 that may be used in connection with the storing or reading of data to a dynamic stripe 460 in the storage array 430 as shown in FIG. 4B, in accordance with an embodiment. As noted earlier, the storing or reading of data may occur at one or more of various times during the normal operation or failed storage device rebuild process shown in FIG. 2, including, for example, block 220 (e.g., garbage collection), block 250 (e.g., store reconstructed data of failed storage device), and/or block 270 (e.g., copy reconstructed data to replacement storage device).

The stripe mapping table 600 may include a plurality of entries 610, each of which corresponds to a respective dynamic stripe 460 in the storage array 430. In turn, each entry 610 may contain a plurality of chunk location fields 615, each of which corresponds to a respective chunk 450 in the dynamic stripe 460. Each chunk location field 615 contains information that identifies the dynamically selected location of the respective chunk 450 in the storage array 430. As described above with respect to FIGS. 3 and 4B, the location of each chunk 450 may be individually selected based on one or more conditions associated with the location of the chunk. The information contained in each chunk location field 615 may include the devID and the startLBA for the respective chunk, as described above with respect to FIGS. 4A and 4B.

As an example, reference may be made to the entry 610 corresponding to the dynamic stripe 460 shown in FIG. 4B. The entry 610 contains five chunk location fields 615*a*, 615*b*, 615*c*, 615*d*, and 615*e* that respectively correspond to the five chunks 450*a*, 450*b*, 450*c*, 450*d*, and 450*e* in the dynamic stripe 460. As shown, the chunk location fields 615*a*, 615*b*, 615*c*, 615*d*, and 615*e* of the entry 610 respectively contain the location information (2, 300), (1, 400), (0, 100), (3, 600), and (4, 200) that indicates the dynamically selected locations of the corresponding chunks 450*a*, 450*b*, 450*c*, 450*d*, and 450*e* in the dynamic stripe 460.

The PBA 520 shown in FIG. 5 may be used to access an entry 610 in the stripe mapping table 600 in connection with the storing or reading of data to the dynamic stripe 460. Specifically, the stripe number field 521 may be used as an index to select the entry 610 in the stripe mapping table 600, and the chunk number field 522 may be used as an offset into the entry 610 to select the corresponding chunk location field 615 for the respective chunk in the dynamic stripe 460.

In this manner, it can be seen that the stripe mapping table 600 can be used to implement the storing of data in the plurality of dynamically selected locations (e.g., dynamic stripe) in the storage array 430.

Figure 7:
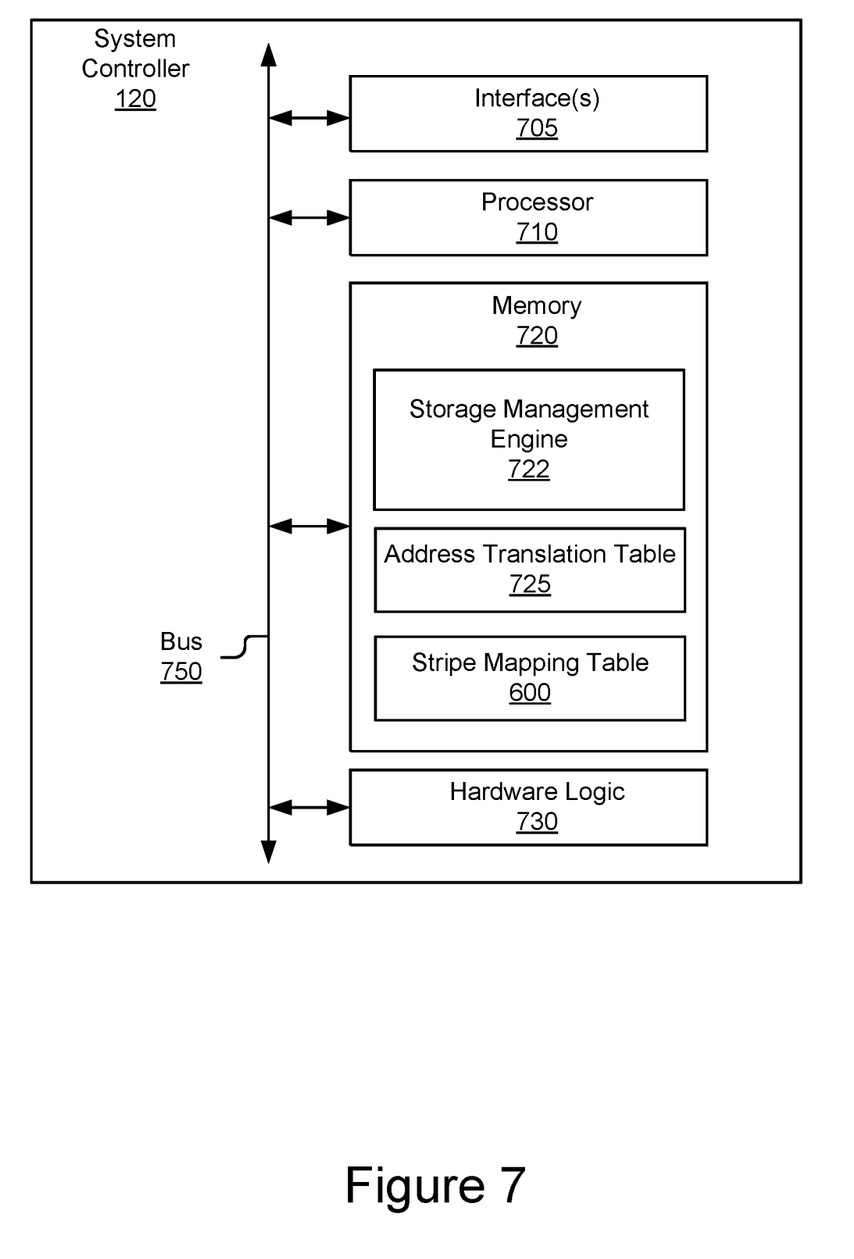
FIG. 7 depicts a block diagram of an example system controller in the storage system shown in FIG. 1, in accordance with an embodiment.

FIG. 7 depicts a block diagram of an example system controller 120 in the storage system 110 shown in FIG. 1, in accordance with an embodiment. As shown, the system controller 120 may comprise, among other components, one or more interface(s) 705, a processor 710, a memory 720 containing software, firmware and/or data including a storage management engine 722, an address translation table 725, and the stripe mapping table 600. A bus 750 may be used to communicatively couple the various components of the system controller 120. It should be understood that the system controller 120 may include alternative, additional and/or fewer components depending on the configuration, such as configurations combining elements, implementing elements in hardware vs. software, etc.

The one or more interface(s) 705 may communicatively couple the system controller 120 to the host 101 and/or the storage array 130. The one or more interface(s) 705 may include, but are not limited to, input/output (I/O) interface circuitry that uses appropriate communications protocol(s) for communicating with the host 101 and/or the storage array 130.

The processor 710, which may include one or more processing units, may be used to execute the instructions of various software programs contained in the memory 720. The processor 710 may include one or more processing units and/or cores, programmable integrated circuits such as application-specific integrated circuits (ASICs) or field-programmable gate arrays (FPGAs), or some combination thereof. The processor 710 may be based on various computing architectures including a complex instruction set computer (CISC) architecture, a reduced instruction set computer (RISC) architecture, or an architecture implementing a combination of instruction sets. It should be understood that other configurations of the processor 710 are possible.

The memory 720, which may include one or more non-transitory storage devices, may store software programs, firmware and/or data that are executed or otherwise processed by the processor 710. The memory 720 may comprise, for example, volatile memory such as dynamic random-access memory (DRAM) device(s), static random-access memory (SRAM) device(s), non-volatile memory such as electrically erasable programmable read-only (EEPROM) or flash memory devices, a combination of the foregoing, and/or some other suitable type of data storage medium.

The storage management engine 722 contained in memory 720 may include routines and/or instructions that when executed by the processor 710 may perform one or more of the various storage management operations for the storage array 130 described above including operations relating to storage device rebuild and/or garbage collection.

The address translation table 725 contained in memory 720 may include address information used by the storage management engine 722 to translate an LBA 510 to a PBA 520 in connection with the storing of data to the storage array 130, as described above with respect to FIG. 6.

As described above with respect to FIG. 6, the stripe mapping table 600 contained in memory 720 may be used in connection with the storing or reading of data to the dynamic stripe 460 in the storage array 430.

In some embodiments, one or more hardware logic module(s) 730, such as ASICs, FPGAs, etc., may be employed in place of, or as a supplement to, the software and/or firmware in the memory 720 to perform one or more of the aforementioned functions provided by the storage management engine 722, address translation table 725 and/or stripe mapping table 600.

Systems and methods for rebuilding a failed storage device in a storage system using dynamically selected locations in system-level OP space are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method, the method comprising:

designating a portion including a predetermined percentage of a usable space in a storage system as a system-level overprovisioned (OP) space;

in response to a detection of a failed storage device in the storage system, reconstructing data of the failed storage device based on data read from a plurality of functioning storage devices in the storage system;

temporarily storing the reconstructed data of the failed storage device in a plurality of dynamically selected locations in the system-level OP space;

in response to an installation of a replacement storage device in the storage system, copying the temporarily stored reconstructed data of the failed storage device from the plurality of dynamically selected locations in the system-level OP space to the replacement storage device; and in response to copying the temporarily stored reconstructed data of the failed storage device from the plurality of dynamically selected locations in the system-level OP space to the replacement storage device, restoring the system-level OP space to a level prior to a failure of the failed storage device.

2. The computer-implemented method of claim 1, wherein the temporarily storing the reconstructed data comprises:

individually selecting each dynamically selected location of the plurality of dynamically selected locations based on a condition associated with the dynamically selected location; and temporarily storing the reconstructed data of the failed storage device in the plurality of dynamically selected locations.

3. The computer-implemented method of claim 2, wherein the condition includes one or more of:
whether the dynamically selected location is currently unused;
whether the dynamically selected location satisfies one or more performance-related criteria; and
whether the dynamically selected location satisfies one or more reliability-related criteria.

4. The computer-implemented method of claim 3, wherein at least one of the one or more performance-related criteria relates to reducing a latency of the storage system.

5. The computer-implemented method of claim 4, wherein the at least one performance-related criteria is that a present length of a data queue associated with the dynamically selected location does not exceed a predetermined threshold.

6. The computer-implemented method of claim 3, wherein at least one of the one or more reliability-related criteria relates to increasing a life expectancy of the storage system.

7. The computer-implemented method of claim 6, wherein the at least one reliability-related criteria is that a present erase count associated with the dynamically selected location does not exceed a predetermined threshold.

8. The computer-implemented method of claim 1, further comprising:
using:
one or more dynamic stripes configured to store the reconstructed data of the failed storage device; and
a stripe mapping table including location information that corresponds to the one or more dynamic stripes.

9. The computer-implemented method of claim 1, further comprising:
determining whether system-level write amplification is low; and
responsive to determining that the system-level write amplification is low, increasing a limit on a maximum amount of the system-level OP space used for temporarily storing the reconstructed data of the failed storage device.

10. The computer-implemented method of claim 1, wherein:
the system-level OP space includes an amount of space for performing one or more system maintenance functions while being used for temporarily storing the reconstructed data of the failed storage device; and
the system-level OP space is invisible to a host system configured to be coupled to the storage system.

11. A storage system, comprising:
a storage array including a plurality of storage devices;
a system controller comprising one or more processors, the one or more processors configured to perform operations comprising:
designating a portion including a predetermined percentage of a usable space in the storage array as a system-level overprovisioned (OP) space;
in response to a detection of a failed storage device in the storage array, reconstructing data of the failed storage device based on data read from a plurality of functioning storage devices in the storage array;
temporarily storing the reconstructed data of the failed storage device in a plurality of dynamically selected locations in the system-level OP space;
in response to an installation of a replacement storage device in the storage array, copying the temporarily stored reconstructed data of the failed storage device from the plurality of dynamically selected locations in the system-level OP space to the replacement storage device; and
in response to copying the temporarily stored reconstructed data of the failed storage device from the plurality of dynamically selected locations in the system-level OP space to the replacement storage device, restoring the system-level OP space to a level prior to a failure of the failed storage device.

12. The storage system of claim 11, wherein the temporarily storing the reconstructed data comprises:
individually selecting each dynamically selected location of the plurality of dynamically selected locations based on a condition associated with the dynamically selected location; and
temporarily storing the reconstructed data of the failed storage device in the plurality of dynamically selected locations.

13. The storage system of claim 12, wherein the condition includes one or more of:
whether the dynamically selected location is currently unused;
whether the dynamically selected location satisfies one or more performance-related criteria; and
whether the dynamically selected location satisfies one or more reliability-related criteria.

14. The storage system of claim 13, wherein at least one of the one or more performance-related criteria relates to reducing a latency of the storage system.

15. The storage system of claim 14, wherein the at least one performance-related criteria is that a present length of a data queue associated with the dynamically selected location does not exceed a predetermined threshold.

16. The storage system of claim 13, wherein at least one of the one or more reliability-related criteria relates to increasing a life expectancy of the storage system.

17. The storage system of claim 11, wherein the operations further comprise:
using:
one or more dynamic stripes configured to store the reconstructed data of the failed storage device; and
a stripe mapping table including location information that corresponds to the one or more dynamic stripes.

18. The storage system of claim 11, wherein the operations further comprise:
determining whether system-level write amplification is low; and
responsive to determining that the system-level write amplification is low, increasing a limit on a maximum amount of the system-level OP space used for temporarily storing the reconstructed data of the failed storage device.

19. The storage system of claim 11, wherein:
the system-level OP space includes an amount of space for performing one or more system maintenance functions while being used for temporarily storing the reconstructed data of the failed storage device; and
the system-level OP space is invisible to a host system configured to be coupled to the storage system.

20. An apparatus, comprising:
one or more processors;
a memory; and
a storage management engine stored on the memory and executable by the one or more processors, the storage management engine comprising:
- means for designating a portion including a predetermined percentage of a usable space in a storage system as a system-level overprovisioned (OP) space;
- means for reconstructing, in response to a detection of a failed storage device in the storage system, data of the failed storage device based on data read from a plurality of functioning storage devices in the storage system;
- means for temporarily storing the reconstructed data of the failed storage device in a plurality of dynamically selected locations in the system-level OP space;
- means for copying, in response to an installation of a replacement storage device in the storage system, the temporarily stored reconstructed data of the failed storage device from the plurality of dynamically selected locations in the system-level OP space to the replacement storage device; and
- means for restoring, in response to copying the temporarily stored reconstructed data of the failed storage device from the plurality of dynamically selected locations in the system-level OP space to the replacement storage device, the system-level OP space to a level prior to a failure of the failed storage device.

* * * * *